United States Patent [19]
Diassi et al.

[11] 3,891,629
[45] June 24, 1975

[54] PROCESS FOR THE PREPARATION OF 6-[D-2-AMINO-2(1,4-CYCLO-HEXADIENYL)ACETAMIDO] PENICILLANIC ACID

[75] Inventors: Patrick Andrew Diassi, Westfield, N.J.; Manmohan Singh Atwal, New York, N.Y.

[73] Assignee: E. R. Squibb & Sons, Inc., Princeton, N.J.

[22] Filed: Feb. 16, 1973

[21] Appl. No.: 333,264

[52] U.S. Cl............ 260/239.1; 424/271; 260/243 C
[51] Int. Cl............................................. C07d 99/16
[58] Field of Search................................. 260/239.1

[56] References Cited
UNITED STATES PATENTS

| | | |
|---|---|---|
| 3,352,858 | 11/1967 | Crast et al...................... 260/243 C |
| 3,485,819 | 12/1969 | Weisenborn et al............ 260/243 C |
| 3,539,562 | 11/1970 | Diassi et al..................... 260/243 C |
| 3,549,628 | 12/1970 | Chauvette....................... 260/243 C |
| 3,576,797 | 4/1971 | Doyle et al. .................... 260/239.1 |
| 3,663,563 | 5/1972 | Fosker et al..................... 260/239.1 |

*Primary Examiner*—Nicholas S. Rizzo
*Attorney, Agent, or Firm*—Lawrence S. Levinson; Merle J. Smith; Stephen B. Davis

[57] ABSTRACT

A process for the preparation of 6-[D-2-Amino-2-(1,4-cyclohexadienyl)acetamido]penicillanic acid is described utilizing N-(2,2,2-trichloroethyloxycarbonyl-D-α-(1,4-cyclohexadien-1-yl)glycine and 6-aminopenicillanic acid, 2,2,2-trichloroethyl ester.

4 Claims, No Drawings

PROCESS FOR THE PREPARATION OF 6-(D-2-AMINO-2(1,4-CYCLO-HEXADIENYL)ACETAMIDO) PENICILLANIC ACID

In the continuing search to prepare improved antibiotics, a compound has been prepared having excellent antimicrobial properties which is the subject of U.S. Pat. No. 3,485,819, issued Dec. 23, 1969. This compound (epicillin) has the following structure:

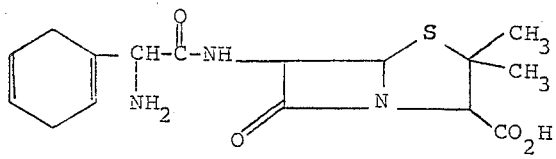

I

This invention relates to a method for the convenient production of epicillin.

More specifically, this invention relates to the following synthetic route:

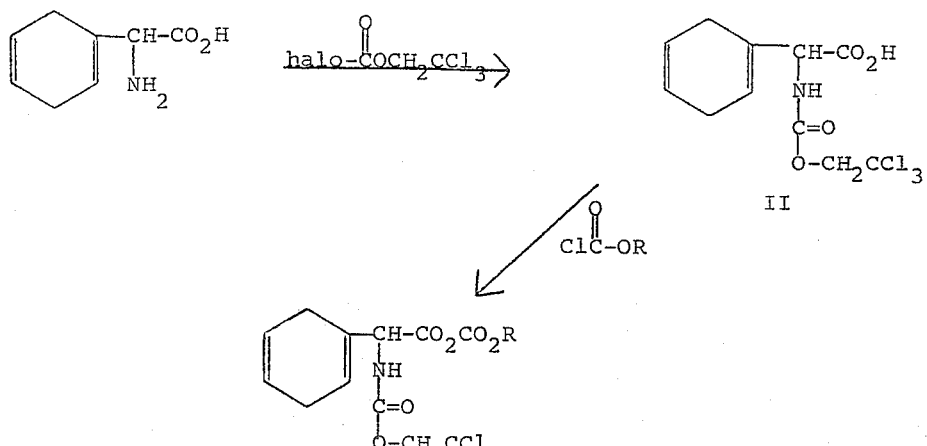

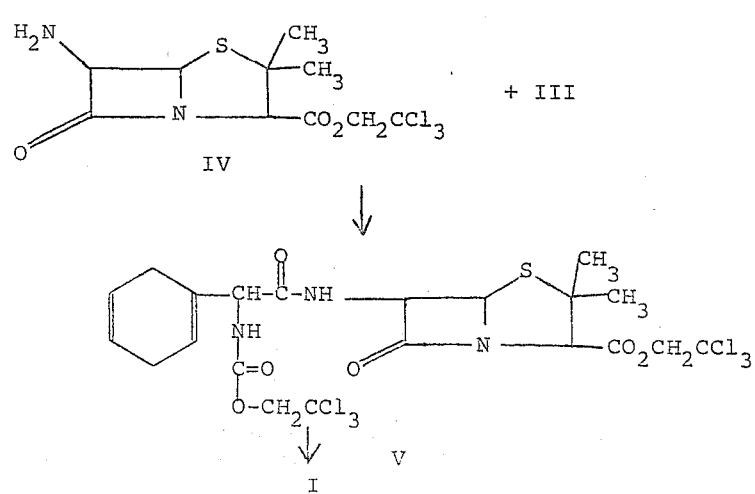

wherein R is lower alkyl; and the useful intermediate V.

In this invention, the term lower alkyl is intended to mean a straight or branched hydrocarbon group of from one to seven carbon atoms.

The compound of the structure II is prepared by the reaction of 2,2,2-trichloroethyl chloroformate with D-1,4-cyclohexadien-1-yl-glycine by standard chemical reactions.

The process of this invention relates to the reaction of compounds of the type III with compounds of the type IV to give a compound of the structure V. This reaction is accomplished by the initial use of three solutions: (1) a lower alkyl haloformate in an anhydrous organic solvent, e.g., methyl, chloroformate in anhydrous dimethoxyethane, diethyl ether or tetrahydrofuran, (2) compound IV in an organic solvent, such as dimethoxyethane, diethyl ether or preferably tetrahydrofuran and (3) the compound of the type III in an organic solvent, such as dimethoxyethane diethyl ether or tetrahydrofuran and an acid acceptor such as sodium bicarbonate, trimethylamine or triethylamine accompanied by a catalytic amount of a strong organic base, such as benzyldimethylamine, dibenzylmethylamine, or p-methoxybenzylamine.

While organic ethers are the preferred solvents, aromatic hydrocarbons, such as toluene, hydrocarbons, such as 3-methylpentane, halogenated hydrocarbons such as chloroform and carbon tetrachloride or other standard solvents such as dimethylformamide may be used. In choosing a solvent, one need only require that the solvent remain a liquid at the temperature run reaction is to be ruun at, that the solvent be inert to the reactants, and that it at least partially dissolve the reactants. The reaction is generally conducted from about 10° to about −50°C, preferably −25°C for from about 30 minutes to about 12 hours, preferably four hours.

Generally, solution 3 is slowly added to solution 1 and to this material solution 2 is slowly added.

In addition, this invention relates to the process involved in the removal of the protective groups ($CCl_3Ch_2-$) from compound V.

This is achieved by dissolving the compound of formula V in about 90 percent aqueous formic acid at from about 0° to about 10°C, and to this solution, zinc dust (about three to about ten times the weight of bis-trichloroethyl compound) is added slowly. Depending upon the rate of stirring, efficiency of cooling (heat transfer), etc., one must alter the rate of addition and length of stirring after the addition is complete to insure complete reaction. However, in typical laboratory scale preparations, addition periods of from 3 to 15 minutes coupled with an additional 15 minutes to about four hours to permit the reaction to go to completion are generally adequate.

DETAILED DESCRIPTION

The following examples are provided for illustrative purposes and may include particular features of the invention; however, the examples should not be construed as limiting the invention, many variations of which are possible without departing from the spirit or scope thereof.

EXAMPLE 1

N-(2,2,2-trichloroethyloxycarbonyl)-D-α-(1,4-cyclohexadienyl)glycine (1,4-cyclohexadienyl)glycine (23.0 g; 150 mmole) is dissolved in 300 ml of water and to this suspension is added 160 ml of 1N sodium hydroxide solution. To this solution, ether (150 ml) is then added. This is designated as Solution A. This Solution A is then placed in a 3 l. three neck flask and cooled in an ice bath. 2,2,2-trichloroethylchloroformate (2.5 g, 200 mmole) is dissolved in 200 ml of dioxane (Solution B), and a 1N sodium hydroxide (200 ml) is designated as Solution C.

Solutions (B) and (C) are added dropwise at the same time to Solution A with constant stirring, while the mixture is cooled in an ice bath. The addition is completed over a period of one hour. The reaction mixture is stirred for an additional one hour period in an ice bath. The resulting mixture is washed with 2 × 300 ml of ether. The aq. phase is then slurried with 350 ml ethylacetate in an ice bath and acidified to a pH 2.5 with syrupy phosphoric acid. The organic phase is separated, washed with 2 × 200 ml water and dried over $MgSO_4$. The solvent is removed on a flash evaporator and the residue dried under vacuum (36.5 g) yield 74 mole %. The material on crystallization from ethyl acetate and petroleum ether gives colorless crystals m.p. 150°C − 152°C.

EXAMPLE 2

2,2,2-Trichloroethyl 6-[N-(2,2,2-Trichloroethyloxycarbonyl)-D(1,4-cyclohexadienyl)glycylamido]penicillanate

MATERIALS

Solution (A)—Methyl chloroformate (0.4 g; .002 mole) in 45 ml of anhydrous tetrahydrofuran Solution (B)—2,2,2-Trichloroethyloxycarbonyl-(1,4-cyclohexadienyl)glycine (1.4 g; .0017 mole) in 25 ml anhydrous tetrahydrofuran + triethylamine (0.5 g) + dimethylbenzylamine (4 drops).

Solution (C)—6-aminopenicillanic acid trichloroethyl ester (2.1 g; .0065 mole) in 30 ml anhydrous tetrahydrofuran.

To Solution (A), cooled to −25°C, solution (B) is added with stirring (during 20 minutes) dropwise manner. Stirring is continued at −25°C for 45 minutes followed by the addition of solution (C) in a dropwise manner and the resulting mixture is then stirred for four hours at −20°C. Next, the mixture is stirred at room temperature for half an hour, and the solvent is then removed on a flash evaporator. The residue is dissolved in 220 ml ethyl acetate and the organic layer is washed with 2 × 50 ml 8% hydrochloric acid, 2 × 50 ml 5% sodium bicarbonate, 2 × 50 ml water, and finally with 2 × 50 ml saturated salt solution. The resulting solution is then dried over anhydrous magnesium sulfate. The solvent is removed and the resulting semi solid residue is dried at 0.6 mm/Hg overnight. A glassy material is obtained, m.p. 68°C − 70°C, Weight 3.8 g, Yield 95%. This material is crystallized from ethylacetate-petroleum ether, m.p. 136° − 138°C.

EXAMPLE 3

Conversion of 2,2,2-Trichloroethyl 6-[N-(2,2,2-Trichloroethyloxycarbonyl)-D-(1,4-cyclohexadienyl)-glycylamido]penicillanate to Epicillin The compound of Example 2 (200 mg, 0.00035 mole) is dissolved in cold 90% aq. formic acid (60 ml). To this solution is then added zinc powder (1.0 g) in several small installments over a period of 7 minutes. After about one and one half hours stirring in an ice bath, the mixture is filtered through hyflo. The residue is washed with 2 × 5 ml 90% formic acid. The combined filtrate is concentrated on flash evaporator and last traces of formic acid are removed from the residue by means of benzene (2 × 20 ml). The dry residue is dissolved in 25 ml water, and pH of the solution is adjusted to 1.5 by means of hydrochloric acid. Hydrogen sulfide gas is next passed through the solution, and the precipitate of zinc sulfide formed is removed by filtration. The filtrate is concentrated to dryness, and the residue is dissolved in 30 ml of acetonitrile plus 4 drops of water. The pH of the solution is adjusted to 8.5. The precipitate formed is filtered and the filtrate is adjusted to a pH 5.0 and stirring continued in an ice bath for two hours. The mixture on seeding and after keeping in a cold room overnight gives a crystalline product which is filtered and dried, weighing 42 mg; yield about 42 mole%.

EXAMPLE 4

6-Aminopenicillanic acid, trichloroethylester p-toluene sulfonate salt

The salicylaldehyde imine of 6-aminopenicillanic acid, trichloroethyl ester (6.0; .0133 mole) is slurried in 40 ml of ethyl acetate. To this suspension is then added 500 mg of p-toluene sulfonic acid monohydrate (500 mg) plus 3 drops of water. The mixture is heated to 5°C, kept at that temperature for about 15 minutes and then let cool to room temperature. The original compound at first dissolves and then the PTSA salt starts crystallizing out. The mixture is stirred at room temperature for an additional ½ hour period and the solid which separates is filtered under suction. The solids obtained are slurried with 20 ml ethyl acetate and filtered. The product obtained is dried under vacuum, giving an almost quantitative yield, m.p. 171°C – 173°C.

EXAMPLE 5

6-Aminopenicillanic acid, trichloroethyl ester

The compound of example 4 is dissolved in 140 ml methylene chloride and to this slurry is added with stirring 140 ml water. The pH of the mixture at this point is 2.5. The mixture is then adjusted to a pH 7.5 by adding a NaHCO$_3$ solution. The reaction is stirred in an ice bath for an additional 45 minutes. The layers are separated, and the methylene chloride layer is washed twice with 8 ml portions of water and finally dried over MgSO$_4$. The solvent is removed on a flash evaporator and the product is obtained in the form of an oil, which on drying under vacuum turns to a white solid weighing 4.5 g, yield mole %~96 (m.p. 75° – 78°C)

What is claimed is:

1. A compound of the formula

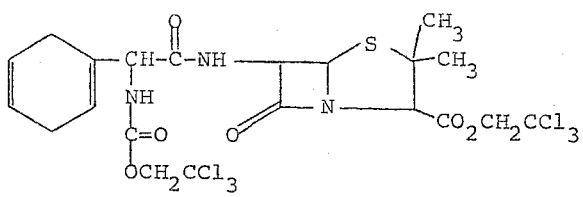

2. A process for the preparation of a compound of the formula

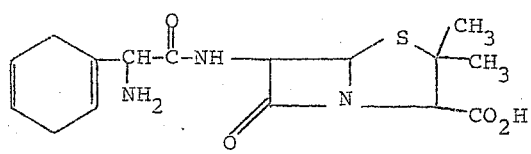

which comprises reducing a compound of the formula

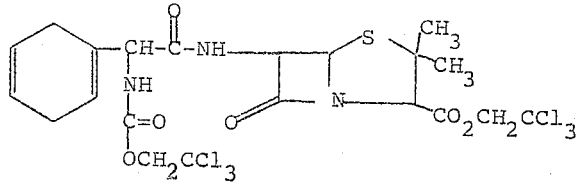

utilizing zinc dust and formic acid.

3. A process for preparing the compound of claim 1 which comprises reacting a compound of the formula:

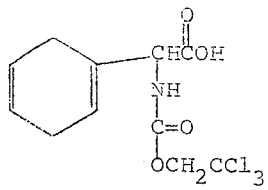

in an anhydrous organic solvent and an acid acceptor and a catalytic amount of a strong base with a lower alkyl haloformate in an anhydrous organic solvent and reacting the product of this reaction with a compound of the formula

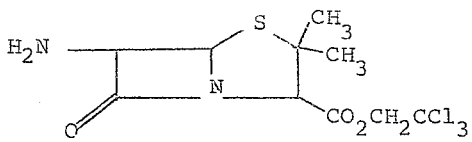

4. The process of claim 3 wherein said acid acceptor is triethylamine, said strong base is benzyldimethylamine, said lower alkyl haloformate is methyl chloroformate and said organic solvent is tetrahydrofuran.

* * * * *

UNITED STATES PATENT AND TRADEMARK OFFICE
CERTIFICATE OF CORRECTION

PATENT NO. : 3,891,629

DATED : 6/24/75

INVENTOR(S) : P. A. Diassi et al.

It is certified that error appears in the above-identified patent and that said Letters Patent are hereby corrected as shown below:

Col. 2, last line, and Col. 3, first line, "the solvent remain a liquid at the temperature run reaction is to be ruun at, that the solvent be inert to the re-" should read -- the solvent remain a liquid at the temperature the reaction is to be run at, that the solvent be inert to the re- --.

Col. 3, line 10, "($CCl_3Ch_2-$)" should read --($CCl_3CH_2-$)--.

Signed and Sealed this eleventh Day of November 1975

[SEAL]

Attest:

RUTH C. MASON
Attesting Officer

C. MARSHALL DANN
Commissioner of Patents and Trademarks